(12) United States Patent
Zok et al.

(10) Patent No.: US 12,560,903 B2
(45) Date of Patent: Feb. 24, 2026

(54) LOG FILE EVALUATION OF LABORATORY AUTOMATION DEVICE WITH STATE MACHINES

(71) Applicant: TECAN TRADING AG, Männedorf (CH)

(72) Inventors: Chiara Marie Zok, Wiesbaden (DE); Georg Hinkel, Wiesbaden (DE)

(73) Assignee: TECAN TRADING AG, Männedorf (CH)

( * ) Notice: Subject to any disclaimer, the term of this patent is extended or adjusted under 35 U.S.C. 154(b) by 387 days.

(21) Appl. No.: 18/328,952

(22) Filed: Jun. 5, 2023

(65) Prior Publication Data

US 2023/0393550 A1 Dec. 7, 2023

(30) Foreign Application Priority Data

Jun. 7, 2022 (EP) .................................... 22177534

(51) Int. Cl.
G05B 19/00 (2006.01)
G05B 19/4063 (2006.01)
(Continued)

(52) U.S. Cl.
CPC ...... G05B 19/4063 (2013.01); G06F 11/0751 (2013.01); G06F 11/1471 (2013.01);
(Continued)

(58) Field of Classification Search
CPC ...... G05B 19/4063; G05B 2219/31392; G05B 2219/35308; G05B 2219/40311;
(Continued)

(56) References Cited

U.S. PATENT DOCUMENTS 5,473,706 A * 12/1995 Bacus .............. G01N 35/00029
382/133
11,977,532 B2 * 5/2024 Liang .................. G06F 16/2246
(Continued)

FOREIGN PATENT DOCUMENTS

EP 2918378 A1 9/2015
WO WO 2006089361 A1 * 8/2006
(Continued)

OTHER PUBLICATIONS

J.F. Dickson, III, "Automation of clinical laboratories", Proceedings of the IEEE (vol. 57, Issue: 11, Nov. 1969, pp. 1974-1987).*
(Continued)

*Primary Examiner* — Srirama Channavajjala
(74) *Attorney, Agent, or Firm* — MH2 Technology Law Group LLP

(57) ABSTRACT

A method for determining states of a laboratory automation device includes: receiving a log file from the laboratory automation device, the log file including entries of events that occurred during a procedure performed by the laboratory automation device, wherein the events have been created by components of the laboratory automation device and each entry includes at least an event time and an event type; providing a state machine of the laboratory automation device, the state machine encoding states of the laboratory automation device and transitions between the states, wherein each transition is starting at a state and points to another state and wherein each transition is associated with an entry scheme in the log file, the entry scheme including at least an event type; setting a current state of the laboratory automation device to a beginning state; moving through the entries of the log file along increasing event time and associating the entries with the current state; during the moving, when an entry scheme associated with a transition starting at the current state is identified in the log file, (Continued)

changing the current state to the state to which the transition (60) is pointing.

12 Claims, 2 Drawing Sheets

(51) Int. Cl.
| | |
|---|---|
| *G06F 11/07* | (2006.01) |
| *G06F 11/1471* | (2026.01) |
| *G06F 11/30* | (2006.01) |
| *G06F 16/00* | (2019.01) |
| *G06F 16/22* | (2019.01) |
| *G06F 16/23* | (2019.01) |

(52) U.S. Cl.
CPC ...... *G06F 11/3075* (2013.01); *G06F 16/2246* (2019.01); *G06F 16/2272* (2019.01); *G06F 16/2358* (2019.01); *G05B 2219/31392* (2013.01)

(58) Field of Classification Search
CPC ....... G05B 2219/40394; G06F 16/2246; G06F 16/2358; G06F 16/2272; G06F 11/1471; G06F 11/3075; G06F 11/0751; G01N 35/00613; G01N 35/00623; G01N 2035/00633; G01N 2035/0643
See application file for complete search history.

(56) References Cited

U.S. PATENT DOCUMENTS

| | | | | |
|---|---|---|---|---|
| 2006/0029184 | A1* | 2/2006 | Lin | G16C 20/20 |
| | | | | 378/73 |
| 2006/0148063 | A1* | 7/2006 | Fauzzi | G01N 1/31 |
| | | | | 422/65 |
| 2009/0192363 | A1* | 7/2009 | Case | G16H 40/67 |
| | | | | 713/193 |
| 2010/0324874 | A9* | 12/2010 | Bangs | G16H 50/50 |
| | | | | 703/11 |
| 2011/0154117 | A1* | 6/2011 | Danielson | G06F 11/321 |
| | | | | 715/764 |
| 2012/0151272 | A1 | 6/2012 | Behrendt et al. | |
| 2013/0041479 | A1* | 2/2013 | Zhang | G05B 19/056 |
| | | | | 700/17 |
| 2015/0158177 | A1* | 6/2015 | Fink | G01N 35/10 |
| | | | | 700/245 |
| 2015/0251315 | A1 | 9/2015 | Brandenberger | |
| 2016/0261541 | A1* | 9/2016 | Samuni | H04L 51/226 |
| 2018/0082042 | A1* | 3/2018 | Volyanskyy | G16H 10/40 |
| 2020/0183805 | A1* | 6/2020 | Togawa | G06F 11/3476 |
| 2023/0019010 | A1* | 1/2023 | Tiwari | G06F 11/3072 |

FOREIGN PATENT DOCUMENTS

| | | | | |
|---|---|---|---|---|
| WO | WO2009051765 | A1 | * | 4/2009 |
| WO | WO 2013/096729 | | * | 6/2013 |
| WO | 2019113296 | A1 | | 6/2019 |
| WO | 2020139989 | A1 | | 7/2020 |

OTHER PUBLICATIONS

H. Cole, "System/7 in a hierarchical laboratory automation system", IBM Systems Journal (vol. 13, Issue: 4, 1974, pp. 307-324).*

D. P. Minchev, Laboratory Automation System Using IOT Devices, Jun. 2020 21st International Symposium on Electrical Apparatus & Technologies (SIELA).*

Megalou-Nash, M. (Authorized officer), Extended European Search Report in corresponding European Application No. 22 177 534.9 mailed on Nov. 18, 2022, 9 pages.

* cited by examiner

| | | | |
|---|---|---|---|
| 58,58a | Sample Concentration | DNA Fragmentation | 58 |
| 58 | polyA Selection | RNA Fragmentation | 58 |
| 58 | 2nd Strand Synthesis | 2st Strand Synthesis | 58 |
| 58 | Bead Purification | End Repair | 58,58b |
| 58 | Library Amplification | Adaptor Ligation | 58 |

LOG FILE EVALUATION OF LABORATORY AUTOMATION DEVICE WITH STATE MACHINES

CROSS REFERENCE TO RELATED APPLICATION

The present application claims the benefit of priority of European Patent Application No. 22 177 534.9, filed on Jun. 7, 2022, the disclosure of which is incorporated by reference herein in its entirety.

FIELD OF THE INVENTION

The invention relates to a method, a computer program and a computer-readable medium for determining states of a laboratory automation device. The invention also relates to an evaluation system for a laboratory automation device.

BACKGROUND OF THE INVENTION

Laboratory automation devices are used for automating task of a laboratory assistant, which, for example, tests a patient for specific diseases. Usually, a sample of the patient's blood, urine, stool, etc. is taken and analysed by means of a bio-chemical procedure. Such a procedure consists in various operations like adding substances, incubating, separating etc. and a measurement process which quantitatively or qualitatively measures the amount or presence of a substance indicating the specific disease. Such an analysis is usually called an assay. The sequence of the steps to be executed is called assay protocol.

All steps of such an assay protocol may be automatically performed by the laboratory automation device. For example, EP 2 918 378 A1 describes such a device.

During performing such an assay protocol, the controllers of the laboratory automation device usually generate one or more log files, where events and messages produced by the controllers are saved. If the assay protocol is aborted due to errors, often the error message in the log file alone is not sufficient to identify the exact problem, as multiple faults might lead to the same error message that one sees in the log files.

Often, it is necessary to understand the context of the laboratory automation devices at the time when the error was logged. This reconstruction, which is usually done by a service technician, can be difficult to achieve because an in-depth understanding of the instrument control software is necessary.

DESCRIPTION OF THE INVENTION

It is an objective of the invention to simplify finding error causes of errors produced during an assay protocol performed by a laboratory automation device. A further objective of the invention is to automate the finding of such error causes.

These objectives are achieved by the subject-matter of the independent claims. Further exemplary embodiments are evident from the dependent claims and the following description.

A first aspect of the invention relates to a method for determining states of a laboratory automation device. The method may be performed automatically by a computing device, which is communicatively interconnected with a controller of the laboratory automation device. Alternatively, the controller itself may automatically perform the method.

According to an embodiment of the invention, the laboratory automation device comprises a plurality of components, which are controlled by control commands, wherein the control commands are generated by one or more controllers of the laboratory automation device.

A component may be any component of the laboratory automation device which states may be affected by the control commands. This includes directly controllable components, such as motors, heaters, etc. and indirectly controllable or passive components, such as grippers, pipettes, reagent tubes, etc.

For example, the components comprise at least one of an instrument arm, a turntable, a gripper, a pipette, a sensor tip, a plate with wells (i.e. a microplate), a cavity, a well, a plunger, a heating device, etc. Each of the instrument arm, turntable, gripper, pipette, sensor tip and plunger may be moved by one or more motors. A microplate or microtiter plate may be a plate, usually made of plastics, which comprises a plurality of wells aligned in a symmetric grid.

In the controllers of the laboratory automation device, each of which may comprise one or more processors, a software program is run, which generates the control commands, such that an assay procedure is performed by the laboratory automation device.

The one or more controllers also generate events and/or messages, which are written as entries into a log file.

With the method, states of the laboratory automation device are determined from this log file. In general, a state may represent an aspect of the assay procedure that is executed using the laboratory automation device. A state may represent positions and/or orientation of components, such as a specific liquid in a specific well. A state also may represent, which part of the assay procedure is the laboratory automation device currently processing, which thread is processing which commands and/or a status of individual motors.

According to an embodiment of the invention, the method comprises: receiving a log file from the laboratory automation device, the log file comprising entries of events that occurred during a procedure performed by the laboratory automation device, wherein the events have been created by components of the laboratory automation device and each entry comprises at least an event time and an event type.

The log file may be a data structure, which comprises a list of entries, each of which has the same fields. The entries may be timely ordered. An entry may be appended to the log file, when a new event occurs. Fields of the entries may be an event time, i.e. the time, when the event occurred, and an event type, which may encode the component, the task of the component and/or the outcome of the task. Events also may be messages and in particular error messages, which also may be seen as event types.

An entry of the log file may comprise further fields, such as data relating to the component and/or its task, for example positions, orientations, sensor measurements, etc. Further entries may encode a thread and/or controller, which has generated the event.

According to an embodiment of the invention, the method comprises: providing a state machine of the laboratory automation device, the state machine encoding states of the laboratory automation device and transitions between the states, wherein each transition is starting at a state and points to another state and wherein each transition is associated with an entry scheme in the log file, the entry scheme comprising at least an event type.

A state machine may be a data structure encoding the states and transitions. The states may be encoded with values and/or codes and/or may optionally comprise a name labelling the state. For example, the state machine may be encoded in XML.

The one or more state machines, which may be associated with the specific procedure that is performed by the laboratory automation device, may be designed manually, for example by a service technician. However, it is also possible that the state machine is automatically determined, for example based on the procedure, which is performed by the laboratory automation device.

The transitions of the state machine are associated with an entry scheme in the log file. In one case, the entry scheme is at least an event type and/or comprises solely a specific field content of one entry. However, an entry scheme may also comprise a specific field content of more than one consecutive entry.

With the one or more state machines, the log file is parsed and whenever entries fitting to an entry scheme of a transition starting at a current state of the state machine is found, the current state is replaced with the state to which the transition is pointing.

A state machine may be manually created by an expert, who in this way provides a description of states and how to manifest those states from entries of the log file. The states that are reconstructed based on this information as described below may therefore be much more reliable and more applicable to the assay procedure compared to automatically identified patterns in the log file. For example, such a state machine may also cover states that are rarely ever entered and therefore hard to identify automatically.

According to an embodiment of the invention, the method comprises: setting a current state of the laboratory automation device to a beginning state; moving through the entries of the log file along increasing event time and associating the entries with the current state; and during the moving, when an entry scheme associated with a transition starting at the current state is identified in the log file, changing the current state to the state to which the transition is pointing.

In such a way, a list of states can be determined, through which the laboratory automation device has went until the end of the log file is reached. Whenever a new current state is determined, it is written to the list of states.

Each entry of the log file can be associated with one of the states, i.e. the state in which the state machine is, when it passes the entry. In particular, error events or error messages can be associated with specific states. This may help in finding the cause of the respective error.

According to an embodiment of the invention, the beginning state is identified by moving through the log file and identifying a transition, which points to a state, to which solely the transition is pointing and setting the beginning state to this state. However, it also may be that the beginning state is a fixed state.

It may be that the beginning state is associated with a specific entry scheme. When starting from the beginning of the log file, the entry scheme is found, the current state of the state machine can be set to the beginning state.

According to an embodiment of the invention, a state additionally has a property. This property may be a value and/or code and/or data, which can be different for an identified state. In other words, it may be that the same state occurs in the list of states generated by the state machine but that the property is different for these states. For example, the property is a type and/or amount of liquid that is transported by a specific component.

When an entry scheme associated with a transition starting at the current state is identified in the log file, the current state is changed to the state to which the transition is pointing and the property is determined. The property of the current state may be determined based on the entries for which the entry scheme has been identified and/or from entries before these entries. For example, the property is the content of a specific field of one entry identified by the entry scheme.

According to an embodiment of the invention, the entries of the log file further comprises additional data, such as one or more specific fields, from which the property is determined. For example, the property may be determined by evaluating one or more of the fields of the entries found by the entry scheme.

According to an embodiment of the invention, each entry of the log file further comprises an identifier identifying a thread and/or component associated with the entry. The identifier may be a thread identifier or a motor identifier, for example. Also from such an identifier, a property of the state machine may be derived and/or set.

According to an embodiment of the invention, at least two state machines are provided, wherein each state machine is associated with an identifier. An identifier may identify events and/or entries from a specific thread, module or part of the computer program, in particular a part that is executed in parallel and/or independently from other parts of the computer program. For example, the identifier may identify entries from a specific processor and/or specific controller.

Multiple different state machines may be used for the same log file to represent the state of the laboratory automation device from different viewpoints. These different state machines may represent different hardware parts and/or components of the laboratory automation device and/or different threads that run part of the control logic, such as different scripts.

For each or some of the identifiers, a dedicated state machine may be provided and may be used for evaluating the log file. Thus, there may be lists of states associated with some or all of the identifiers.

According to an embodiment of the invention, for each state machine, a state machine dependent current state of the laboratory automation device is set to a beginning state. In the case of several state machines, the respective beginning states may be different and/or be set based on different entry schemes.

According to an embodiment of the invention, when an entry scheme associated with a transition starting at the state machine dependent current state is identified in the log file, the state machine dependent current state is changed to the state to which the transition is pointing. The state machines of different identifiers may operate independently from each other. One state machine may have a state transition, when another has not.

According to an embodiment of the invention, the log file is generated by at least one thread running in a computing device of the laboratory automation device and controlling the laboratory automation device. It may be that there is a dedicated thread, which processes the events and messages and which generates the log file. The thread may receive messages about the events from the components, which messages encode the events. The thread also may generate the identifiers, which may be associated with different components.

According to an embodiment of the invention, the log file is generated by at least two threads running in parallel in the computing device of the laboratory automation device and controlling the laboratory automation device. Alternatively, the log file is generated by several threads, which write to it independently from each other. In this case, each thread may write its thread identifier into entries of the log file, which are generated by itself.

According to an embodiment of the invention, the method further comprises: identifying a type and/or configuration and/or software version of the laboratory automation device and selecting the one or more state machines based on the type and/or configuration and/or software version. There may be a plurality of state machines, which are selected based on specific features of the laboratory automation device and/or its software. Such information may be encoded in a header of the log file. In a first step of the method, the header of the log file may be evaluated to determine, which state machines have to be used to evaluate the entries of the log file.

According to an embodiment of the invention, the method further comprises: determining a fault of the laboratory automation device by identifying a pattern of transitions in the log file, wherein the transitions are sorted with respect to the event times of the entries associated with the transitions. The list of states or the transition, from which this list can be determined, may have specific patterns, when a specific fault has occurred. These patterns, which may be predefined and/or which may be specific for a specific state machine, may be recognized and a fault may be determined in this way.

According to an embodiment of the invention, the method further comprises: displaying the entries of the log file and the state machine on a user interface; highlighting the state of the state machine associated with a selected entry of the log file. This may help a service technician to identify problems, which have been occurred with the laboratory automation device, during the time, when the log file was generated.

A further aspect of the invention relates to a computer program for determining the state of a laboratory automation device, which, when being executed by a processor, is adapted to carry out the steps of the method as described in the above and in the following. As already mentioned, the computer program may be either executed by one or more controllers of the laboratory automation device and/or by a further computing device.

A further aspect of the invention relates to a computer-readable medium, in which such a computer program is stored. A computer-readable medium may be a hard disk, an USB (Universal Serial Bus) storage device, a RAM (Random Access Memory), a ROM (Read Only Memory), an EPROM (Erasable Programmable Read Only Memory) or a FLASH memory. A computer-readable medium may also be a data communication network, e.g. the Internet, which allows downloading a program code. In general, the computer-readable medium may be a non-transitory or transitory medium.

A further aspect of the invention relates to an evaluation system for the laboratory automation device, which is adapted for performing the method as described herein.

The evaluation system comprises a laboratory automation device with a plurality of components, for example such as described above.

The evaluation system further comprises a monitoring and control device for controlling the components, receiving messages from the components and for generating a log file from the messages. This device may comprise one or more controllers of the laboratory automation device and/or an external computing device, which is in communication with the one or more controllers.

The evaluation system further comprises an evaluation device for determining states of a laboratory automation device. The evaluation device may be a computing device separate from the laboratory automation device and/or may be provided by the monitoring and control device. The log file may be sent via a digital communication line to the evaluation device. For example, the evaluation device may be a PC. It may be that the log file is evaluated remote from the laboratory automation device and/or that the log file is sent via the Internet to the evaluation device.

It has to be understood that features of the method as described in the above and in the following may be features of the evaluation system, the computer program and the computer-readable medium as described in the above and in the following and vice versa.

These and other aspects of the invention will be apparent from and elucidated with reference to the embodiments described hereinafter.

BRIEF DESCRIPTION OF THE DRAWINGS

Below, embodiments of the present invention are described in more detail with reference to the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figures 1, 2:
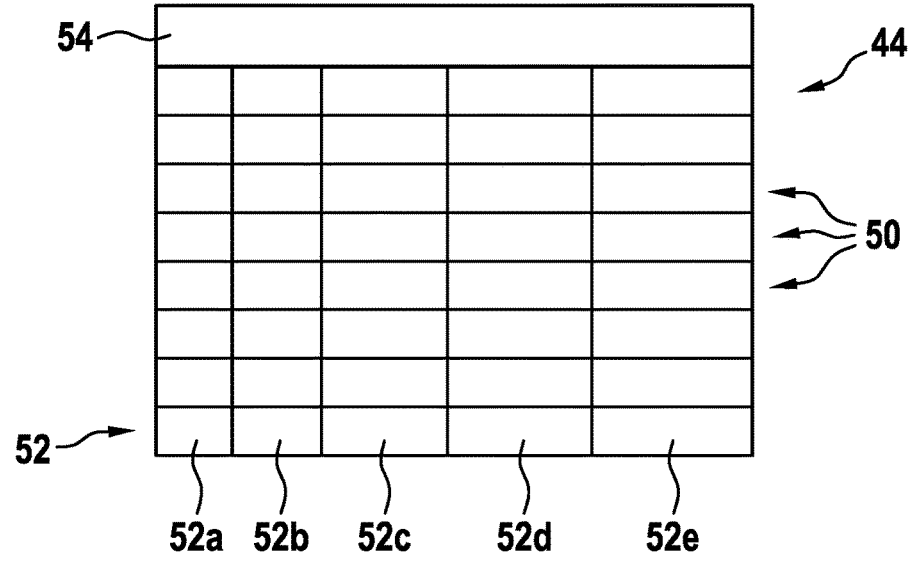
FIG. 1 schematically shows a laboratory automation device according to an embodiment of the invention.
FIG. 2 schematically depicts a log file.

FIG. 1 shows a laboratory automation device 10, which comprises a workbench 12 onto which several components are mountable. The components include a cartridge 14 with pipette tips 16, a cartridge 18 with test tubes 20, a microplate 22 with wells 24, a container 26 containing a reagent 28 and several further microplates 30.

Furthermore, some controllable components are mounted to the workbench 12, which includes a pipette mover 32 comprises a pipette 34, which may be moved in three dimensions, for example with the aid of motors. With the pipette mover 32, the pipette 34 may be moved to the pipette tips 16, which may be stuck on the pipette 34. A sample may be pipetted with the pipette 34 from the test tubes, by being aspirated with a plunger 36 and may be dispensed into a well 24. Analogously, the reagent 28 may be conveyed into the well 24. The controllable components also may comprise a gripper 38 that may comprise a gripper arm 40, which also may be moved in three dimensions and rotated parallel to the workbench 12. With the gripper 38, the microplates 22, 30 may be exchanged and moved into further devices, such as a heater, an optical analysis device, etc.

A monitoring and control device 42, which may be a PC or other computing device, performs the control operation with the laboratory automation device 10, such that the laboratory automation device 10 performs an assay procedure. The monitoring and control device 42 and the laboratory automation device 10 may be interconnected with a communication line, such as an USB cable or an Ethernet cable.

During the assay procedure, a log file 44 is generated. The monitoring and control device 42 receives messages from the controllable components, such as 32, 36, 38, which messages may encode events, errors, information, etc. Some or all of these messages are written as entries into the log file 44.

After the assay procedure, for example, when an error occurred, the log file 44 is sent to an evaluation device 48, which may be a further PC. The evaluation device 48 is connected to the monitoring and control device 42, for example via the Internet 46. The log file 44 is then evaluated by the evaluation device 48 as described above and below.

The evaluation device 48, the monitoring and control device 42 and the laboratory automation device 10 may be seen as an evaluation system 49 of the laboratory automation device 10.

FIG. 2 shows a diagram illustrating a log file 44. The log file 44 comprises entries 50, which all may be structured in the same way. Every entry 50 is composed of fields 52, such as a time stamp and/or event time 52a, an identifier 52b, an event ID and/or event type 52c, an error code 52d, event data 52e, etc. It also may be that the log file comprises a header 54, in which information about the assay procedure, the type and/or configuration of the laboratory automation device 10, the used software and/or its modules, etc. are stored.

Figures 3, 4:
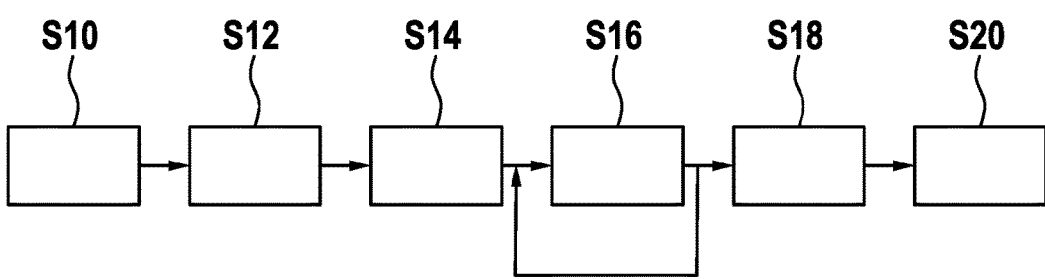
FIG. 3 shows a flow diagram of a method of determining states of a laboratory automation device according to an embodiment of the invention.
FIG. 4 schematically depicts a state machine used in the method of FIG. 2.

FIG. 3 shows a flow diagram for a method for evaluating the log file 44. With the method, states of the laboratory automation device 10 are determined from the log file 44. The method may be performed by the evaluation device 48 and may be implemented in software there. However, it is also possible that at least parts of the method are also performed by the monitoring and control device 42 and/or controllers of the components of the laboratory automation device 10.

In step S10, the log file 44 is received from the laboratory automation device 10. As already mentioned, the log file 44 comprises entries 50 of events that occurred during a procedure performed by the laboratory automation device 10. The events may have been created by components 32, 34, 36, 38, 40 of the laboratory automation device 10. For example, messages encoding these events may have been sent to the monitoring and control device 42, which then generates a corresponding entry 50 in the log file 44. The monitoring and control device 42 may determine an event time 52a for the event (which may be the current time and/or a time stamp thereof) and an event type 52c and may write this data into the log file 44.

The monitoring and control device 42 also may write the header 54 of the log file 44, which may contain a type and/or configuration and/or software version of the laboratory automation device 10.

It may be that the log file 44 is generated by at least one thread, which for example may be run by monitoring and control device 42. It also may be that the log file 44 is generated by at least two threads running in parallel, for example in the monitoring and control device 42 and/or in controllers of the laboratory automation device 10. Each thread may write its thread identifier into the identifier field 52b of the respective entry.

In step S12, one or more state machines 56 (see FIG. 4) of the laboratory automation device 10 are provided. The one or more state machines 56 may be selected based on information about the laboratory automation device 10, such as type and/or configuration and/or software version of the laboratory automation device 10. For example, these information may be encoded in the header 54 of the log file 44.

The evaluation device 48 may store a plurality of different state machines 56, that may have been made by experts for different types and/or configuration and/or software version of the laboratory automation device 10.

In the case, when the entries 50 of the log file 44 comprise an identifier 52b identifying a thread and/or component associated with the entry 50, a state machine 56 for each identifier may be provided, wherein each of these state machines 56 is then associated with an identifier 52b. There may be state machines for different threads and/or different components of the laboratory automation device 10.

FIG. 4 shows an example of a specific state machine 56 used for a specific laboratory automation device 10 performing a specific assay procedure.

As shown in FIG. 4, each state machine 56 encodes states 58 of the laboratory automation device 10 and transitions 60 between these states 58. Each transition 60 is starting at a state 58 and points to another state 58. It is possible that more than one transition 60 start at a state and that more than one transition 60 end at a state 58.

Each transition 60 is associated with a specific entry scheme in the log file 44. The entry scheme encodes or determines at which entry 50 of the log file 44 a transition 60 takes place. The entry scheme may be seen as a collection of rules and/or patterns, which decide, whether one entry 50 or more consecutive entries 50 fulfill the entry scheme.

In a minimal embodiment, the entry scheme comprises solely an event type 52c and the corresponding rule is that the event type 52c of the entry should be the event type of the entry scheme.

In general, the entry scheme may comprise rules with respect to one or more specific fields 52, formulas for evaluating the fields 52 that may be compared with thresholds, etc.

In the following steps, the log file 44 is parsed for associating states 58 of the one or more state machines 56 with entries in the log file 44. For this, the transitions 60 are used.

In step S14, a beginning state 58a for each state machine 56 is determined. The beginning state 58a may be fixed or may be determined from specific transitions 60, which necessarily result in a specific state 58. For example, the log file 44 may be parsed until the entry scheme for an arbitrary transition 60 of the state machine 56 is found and the beginning state 58a is set to the state 58 to which the transition 60 is pointing to.

The beginning state 58a also may be identified by moving through the log file 44 and identifying a transition 60, which points to a state 58, to which solely the transition 60 is pointing and setting the beginning state 58a to this state 58.

Furthermore, for each state machine 56, a current state 58b of the laboratory automation device 10 is set to a beginning state 58a. The current state 58b will then change during the next step, whenever a transition takes place. In this way, a list of states 58 is generated. In the beginning, the list of states solely contains the beginning state 58a.

In step S16, the log file 44 is parsed and the evaluation device 48 moves through the entries and identifies transitions 60. In particular, the movement is along entries 50 with increasing event time 52a.

For each state machine 56, all entries 50 associated with the state machine 56 (for example via the identifier 52*b*) are associated with the current state 58*b*.

When an entry scheme associated with a transition 60, which starts at the current state 58*b* of one of the state machines 56, is identified, the current state 58*b* of this state machine 56 is changed to the state 58 to which the transition 60 is pointing. The new current state 58*b* is added to the list of states 58.

It may be that a state 58 additionally has one or more properties. During a state change, these properties of the current state 58 may then be determined based on the entries 50 for which the entry scheme has been identified and/or from entries before these entries. These properties then are also written into the list of states for the new current state 58*b*.

The properties may be determined from additional data in the entries. For example, positions of components and/or types of liquid processed by the components may be such properties.

The movement through the log file 44 may be performed until the end or a specific entry 50 of the log file 44 is reached.

In optional step S18, a fault of the laboratory automation device 10 is determined by identifying a pattern of transitions 60 in the log file 44. In particular, this pattern also may be identified in the list of states 58 generated in step S16, in which the states and/or the transitions 60 are sorted with respect to the event times 52*a* of the entries 50 associated with the transitions 60. Also properties determined for the states 58 may be used for identifying patterns.

The patterns may be predefined patterns, which may have been provided by experts. Such a pattern may indicate a specific root cause for an error. For example, a pattern may comprise specific combinations of transitions 60 of the state machine 56, optionally with specific values and/or ranges of properties.

It also may be that such a pattern refers to more than one state machine 56.

In optional step S20, the collected and determined information is displayed on a user interface. The evaluation device 48 may have such a user interface. In particular, the entries 50 of the log file 44 and the state machine 56 may be displayed on the user interface. Also, the list of states 58 determined in step S16 may be displayed. When an entry 50 in the displayed log file 44 is selected, the state 58 of the state machine 56 associated with the selected entry 50 may be highlighted and/or the properties determined for this state may be displayed.

In general, the collected information may be presented to a user analyzing the log file 44, for example in the form of state charts. Upon selecting a log entry 50, the user interface may indicate the one or more states 58 that the laboratory automation device 10 had when the selected log entry 50 was created.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS

10 laboratory automation device
12 workbench
14 cartridge for pipette tips
16 pipette tip
18 cartridge for test tubes
20 test tube
22 microplate
24 well
26 container
28 reagent
30 microplate
32 pipette mover
34 pipette
36 plunger
38 gripper
40 gripper arm
42 monitoring and control device
44 log file
46 Internet
48 evaluation device
49 evaluation system
50 entry
52 field
52*a* time stamp/event time
52*b* identifier
52*c* event ID/event type
52*d* error code
52*e* event data
54 header
56 state machine
58 state
58*a* beginning state
58*b* current state
60 transition

We claim:

1. A method for operating a laboratory automation device, the method comprising:

performing a procedure with the laboratory automation device;

receiving a log file from the laboratory automation device, the log file comprising entries of events that occurred during the procedure performed by the laboratory automation device, wherein the events have been created by one or more components of the laboratory automation device and each entry comprises at least an event time and an event type;

invoking a state machine of the laboratory automation device, the state machine being a data structure and encoding states of the laboratory automation device and transitions between the states, wherein each transition is starting at a state and points to another state and wherein each transition is associated with an entry scheme in the log file, the entry scheme comprising at least an event type;

setting a current state of the laboratory automation device to a beginning state;

moving through the entries of the log file along increasing event time and associating the entries with the current state;

during the moving, when an entry scheme associated with a transition starting at the current state is identified in the log file, changing the current state to the state to which the transition is pointing; and determining a fault of the laboratory automation device by identifying a pattern of transitions in the log file wherein the transitions are sorted with respect to the event times of the entries associated with the transitions;

displaying the entries of the log file and the state machine on a user interface; and highlighting the state of the state machine associated with a selected entry of the log file.

2. The method of claim 1, wherein the beginning state is identified by moving through the log file and identifying a transition, which points to a state, to which solely the transition is pointing and setting the beginning state to this state.

3. The method of claim 1, wherein a state additionally has a property; and when an entry scheme associated with a transition starting at the current state is identified in the log file, changing the current state to the state to which the transition is pointing and determining the property of the current state based on the entries for which the entry scheme has been identified and/or from entries before these entries.

4. The method of claim 3, wherein the entries of the log file further comprises additional data from which the property is determined.

5. The method of one of claim 1, wherein each entry of the log file further comprises an identifier identifying a thread and/or component associated with the entry;

wherein at least two state machines are invoked, wherein each state machine is associated with an identifier.

6. The method of claim 5, wherein for each state machine a state machine dependent current state of the laboratory automation device is set to a beginning state;

wherein, when an entry scheme associated with a transition starting at the state machine dependent current state is identified in the log file, the state machine dependent current state is changed to the state to which the transition is pointing.

7. The method of claim 1, wherein the log file is generated by at least one thread running in a computing device of the laboratory automation device and controlling the laboratory automation device;

wherein the thread receives messages from the components, which messages encode the events.

8. The method of claim 7, wherein the log file is generated by at least two threads running in parallel in the computing device of the laboratory automation device and controlling the laboratory automation device;

wherein each thread writes its thread identifier into entries of the log file, which entries are generated by the thread.

9. The method of claim 1, further comprising:

identifying a type and/or configuration and/or software version of the laboratory automation device and selecting the one or more state machines based on the type and/or configuration and/or software version.

10. A computer program for operating a laboratory automation device, which, when being executed by a processor, is adapted to carry out the steps of the method of claim 1.

11. A non-transitory computer-readable medium, in which the computer program according to claim 10 is stored.

12. An operating system for a laboratory automation device, the operating system comprising:

a laboratory automation device with a plurality of components, the laboratory automation device operable to perform a procedure;

a monitoring and control device operable to control the components, receive messages from the components, and generate a log file from the messages;

an evaluation device for determining states of the laboratory automation device, the evaluation device operable to:

receive a log file from the laboratory automation device, the log file comprising entries of events that occurred during the procedure performed by the laboratory automation device, wherein the events have been created by one or more components of the laboratory automation device and each entry comprises at least an event time and an event type;

invoke a state machine of the laboratory automation device, the state machine being a data structure and encoding states of the laboratory automation device and transitions between the states, wherein each transition is starting at a state and points to another state and wherein each transition is associated with an entry scheme in the log file, the entry scheme comprising at least an event type;

set a current state of the laboratory automation device to a beginning state;

move through the entries of the log file along increasing event time and associating the entries with the current state;

during the moving, when an entry scheme associated with a transition starting at the current state is identified in the log file, change the current state to the state to which the transition is pointing; and determine a fault of the laboratory automation device by identifying a pattern of transitions in the log file wherein the transitions are sorted with respect to the event times of the entries associated with the transitions;

display the entries of the log file and the state machine on a user interface; and highlight the state of the state machine associated with a selected entry of the log file.

* * * * *